United States Patent [19]

Nagel

[11] Patent Number: 5,099,795

[45] Date of Patent: Mar. 31, 1992

[54] APPARATUS FOR HOUSING SMALL ANIMALS

[76] Inventor: Hans J. Nagel, Contrescarpe 27, 2800 Bremen 1, Fed. Rep. of Germany

[21] Appl. No.: 427,119

[22] PCT Filed: Mar. 4, 1988

[86] PCT No.: PCT/EP88/00168

§ 371 Date: Oct. 23, 1989

§ 102(e) Date: Oct. 23, 1989

[87] PCT Pub. No.: WO88/08245

PCT Pub. Date: Nov. 3, 1988

[30] Foreign Application Priority Data

Apr. 23, 1987 [DE] Fed. Rep. of Germany ....... 3713611

[51] Int. Cl.⁵ .............................................. A01K 1/02
[52] U.S. Cl. ...................................................... 119/20
[58] Field of Search ........................... 119/20, 22, 28; 198/848, 849

[56] References Cited

U.S. PATENT DOCUMENTS 4,430,960  2/1984  Nagel et al. ................. 119/28 X
4,437,433  3/1984  Nijhof ......................... 119/22 X

FOREIGN PATENT DOCUMENTS 0088500   9/1983  European Pat. Off. .
6809438   6/1969  Fed. Rep. of Germany ........ 119/22
7441540  12/1974  Fed. Rep. of Germany ........ 119/22
2703968  10/1978  Fed. Rep. of Germany ........ 119/22
3042043   5/1982  Fed. Rep. of Germany ........ 119/22
0051844  11/1984  Fed. Rep. of Germany ........ 119/22

Primary Examiner—Gene Mancene
Assistant Examiner—Thomas Price
Attorney, Agent, or Firm—Sughrue, Mion, Zinn, Macpeak & Seas

[57] ABSTRACT

Apparatus for housing small animals, especially poultry to be fattened, such as chickens, within a housing enclosure with a continuous, grate-shaped conveyor supporting floor (21) made of plastic, and which is supported by supporting members (38) extending transversely to the conveying direction of the same and parallel to the supporting floor plane, which is functionally connected to lateral conveying agents (conveyor chains 51), whereby on the upper side of the supporting floor (21), above the supporting members (38), respectively, soft, elastic pads are arranged, especially in the form of tube-shaped or hose-shaped hollow bodies or profiles (40). To simplify the construction, the supporting floor is formed from a continuous track of a relatively finely meshed net (10).

10 Claims, 21 Drawing Sheets

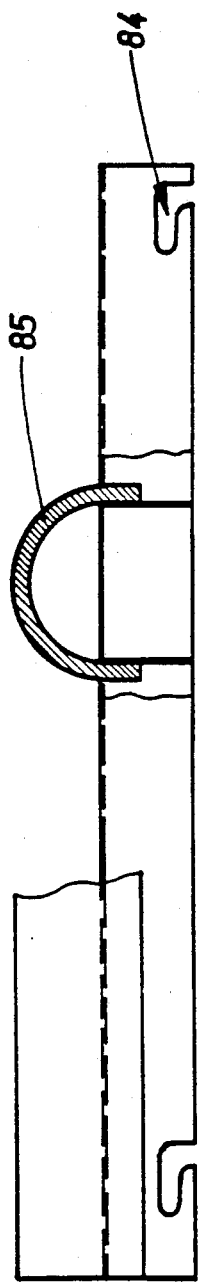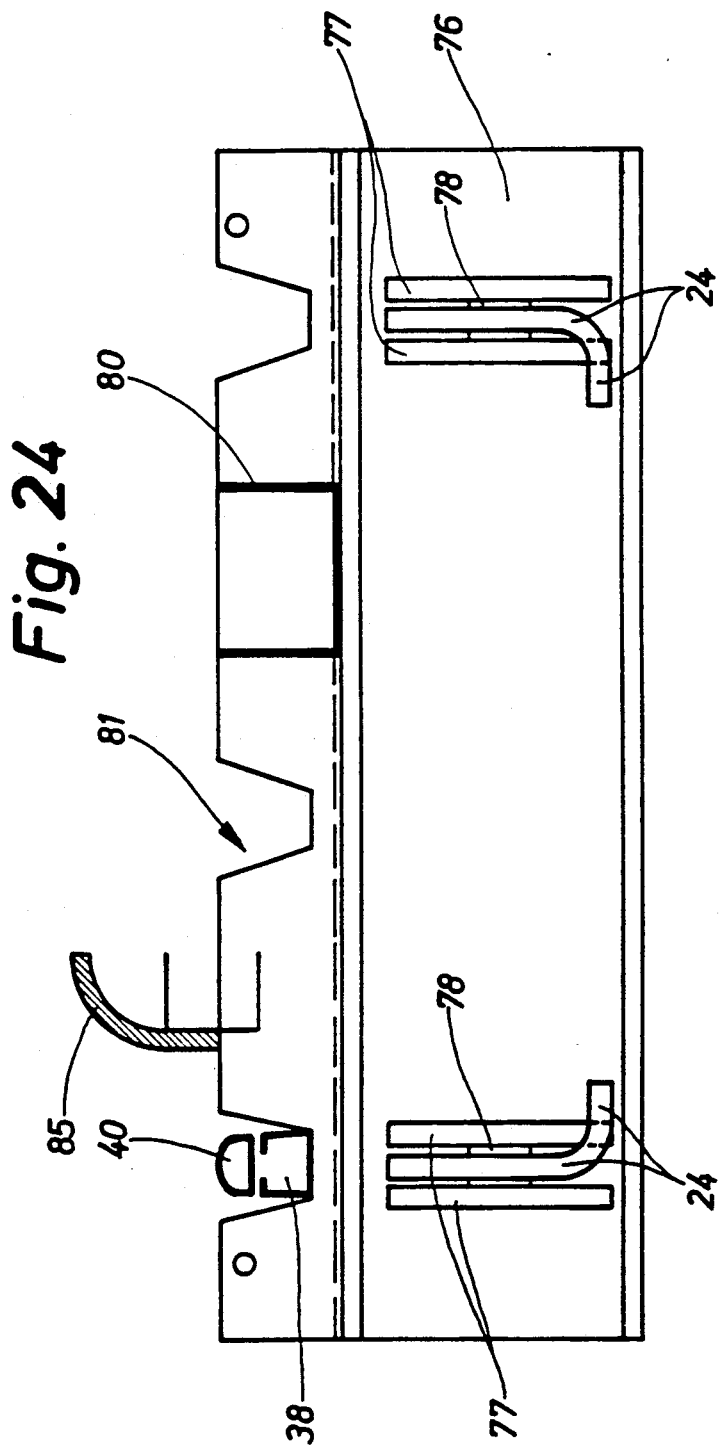

APPARATUS FOR HOUSING SMALL ANIMALS

BACKGROUND OF THE INVENTION

The invention concerns an apparatus for housing small animals, especially poultry to be fattened, such as chickens.

The breeding of poultry to be fattened, especially chickens, takes place in large-area housing enclosures on a continuous enclosure floor. The chickens reared in a housing enclosure are transported away at the same time when they have reached the desired weight.

To facilitate this removal, which is a problem in the keeping of small animals, it has already been proposed to provide above the enclosure floor a grate-shaped supporting floor designed as a conveyor belt. The supporting floor, consisting of individual tracks located next to one another, is moved to one side of the housing enclosure, carrying the chickens along with it. In a region where the supporting floor is deflected, the chickens pass on to a transversely directed conveyor belt to be conveyed away out of the housing enclosure (DE-A 2703 968). In this known proposal the supporting floor or the tracks of the same consist of individual grate bars made of plastic, which are articulated to one another. These are arranged rotatably by means of bearing sleeves on transversely directed supporting bars. Such a design of the supporting floor or the tracks of said proposal has proven to be unfavourable in practice. The resting base is too hard for the sensitive animals. Because of the ribs, pressure points arise, especially in the region of the animals' breasts, when they rest on the supporting floor for a relatively long time. Furthermore the relative movement between the grate elements or bars is unfavourable because of the danger of soiling, clogging of dung, and the like.

According to a proposal in accordance with EP-B-51 844 (corresponding to U.S. Pat. No. 4,430,960) these disadvantages are to be eliminated by having the supporting floor consist of intersecting, supporting profiles made of an elastic, soft material, especially soft PVC, and on the upper side, in each case above the supporting rods, by having soft, elastic elevations. This type of construction, indeed, has proven to be favourable in practice. However, it is still relatively expensive, in manufacture as well as in assembly.

SUMMARY OF THE INVENTION

The objective of the present invention, therefore, is to further develop and improve the latter mentioned type of construction so that with simpler means still better breeding will be obtained.

Thus, the supporting floor constructed according to invention no longer consists of members movable relative to one another or of mats, made of intersecting supporting profiles, which are to be connected to one another, but rather of a continuous track of relatively finely meshed netting, which can be manufactured and assembled with the greatest simplicity. This is also true for the connection of the supporting profiles to one another and for the mats assigned to said profiles. To be mentioned especially in this regard is a novel construction in which an integrated conveying agent consists of supporting floor net, supporting profiles and the assigned mats.

Preferably, the supporting floor net is produced from reinforced plastic threads made of relatively soft and elastic plastic, especially polyamid, whereby the reinforcement is formed by a heavy-duty core, e.g. textile or metal wire cores.

Also of special importance is the use of a simple open-link chain as a supporting floor conveying agent and the corresponding adjustment of the driving and guiding means.

In order to keep the supporting floor net, provided according to invention, taut at least in the region of the upper stringer, the deflection and support of said net are controlled by adjustable guide drums.

Surprisingly it is possible to achieve a considerably greater fattening result when utilizing the apparatus according to invention in comparison to the apparatus according to EP-B-51 844, even when the other external conditions remain the same. The meat yield is approx. 7–10% higher. Moreover, the meat is considerably more tender.

The net threads have a diameter preferably of approx. (1–2) mm. The mesh size, preferably, is approx. (10–13) mm × (13–17) mm, especially 12 mm × 15 mm. In the comparative experiments carried out, the net racks were supported at distances of 9 cm each by means of transversely directed supporting profiles. Correspondingly, the mats assigned to the supporting profiles are spaced apart from one another in the conveying direction. The pads are constructed preferably in the form of continuous, soft hoses. This makes possible the keeping of the animals without the development of breast blisters. The diameter of the "padding-hoses" is approx. (10–11) mm; the wall thickness approx. (1–2) mm, preferably approx. 1.5 mm. The "padding-hoses" are closed at the ends, e.g. by means of flattening, adhesive bonding, welding, or the like.

Embodiments of the invention are explained in more detail below with reference to the drawings. Presented are:

DETAILED DESCRIPTION OF THE DRAWINGS

Figure 1:
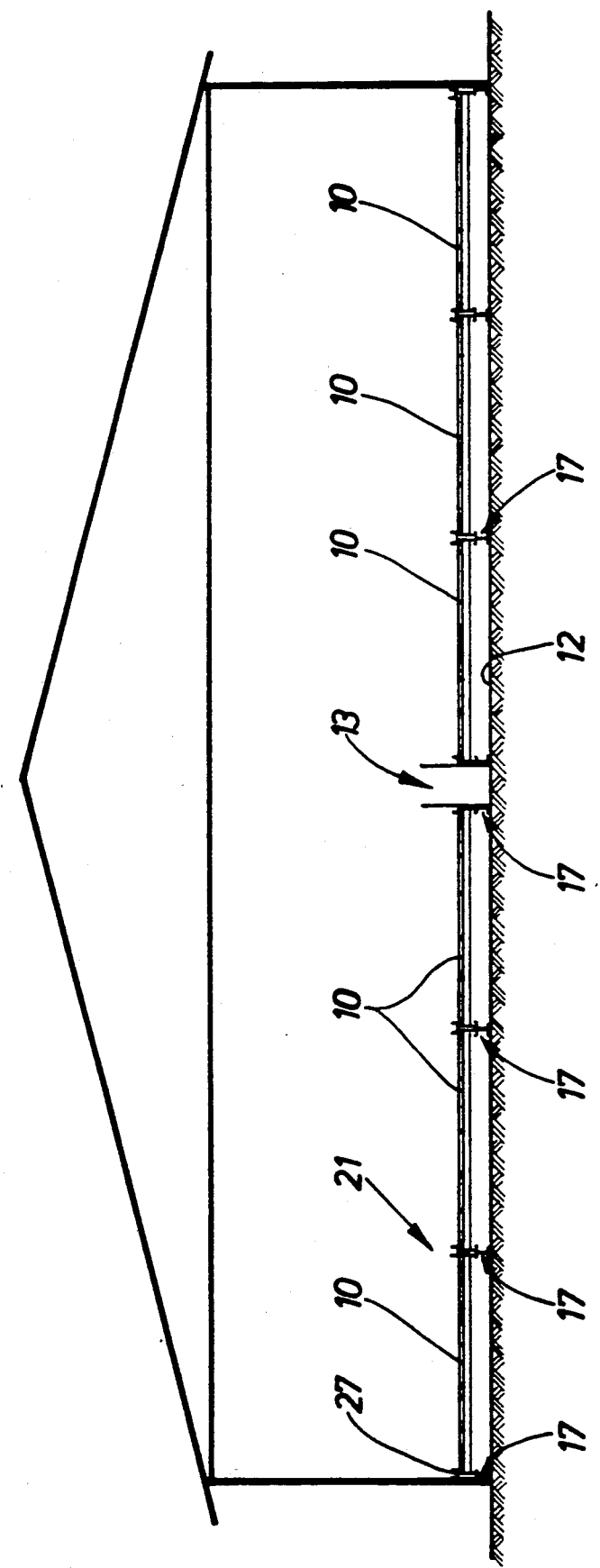
Figure 2:
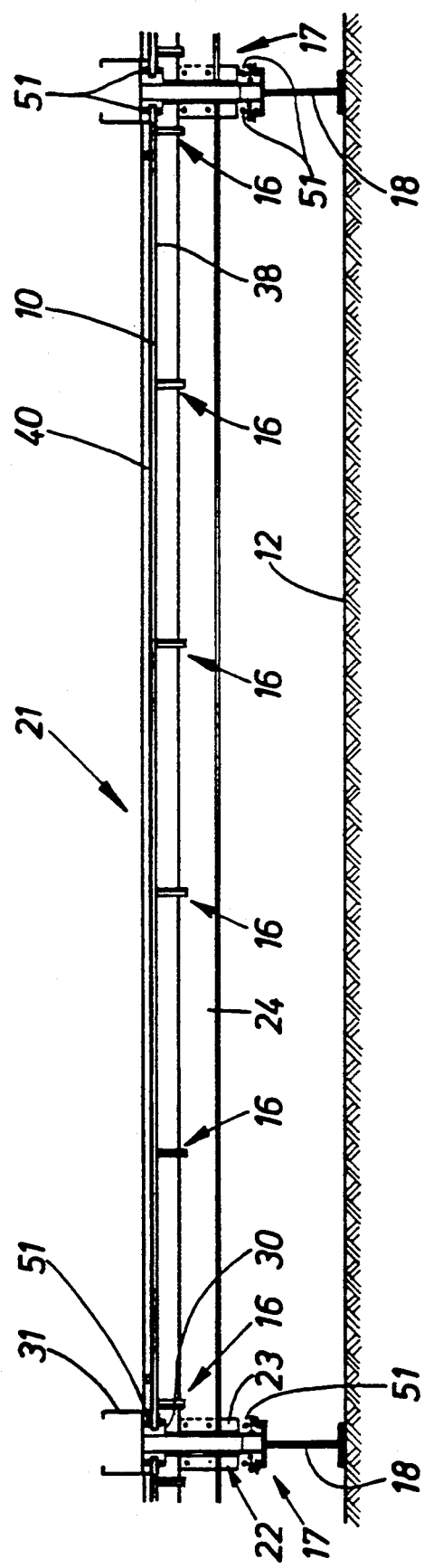
Figure 3:
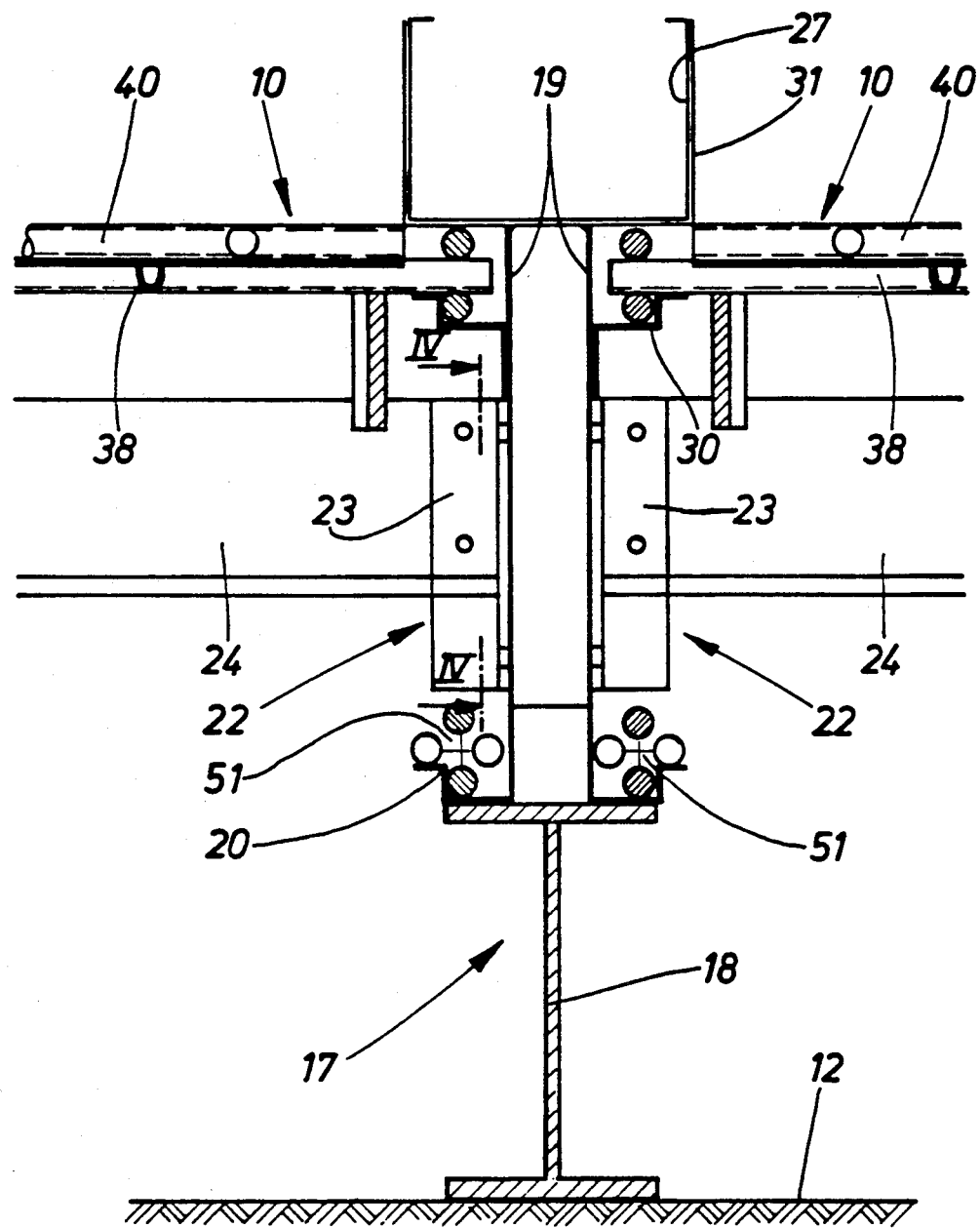
Figure 4:
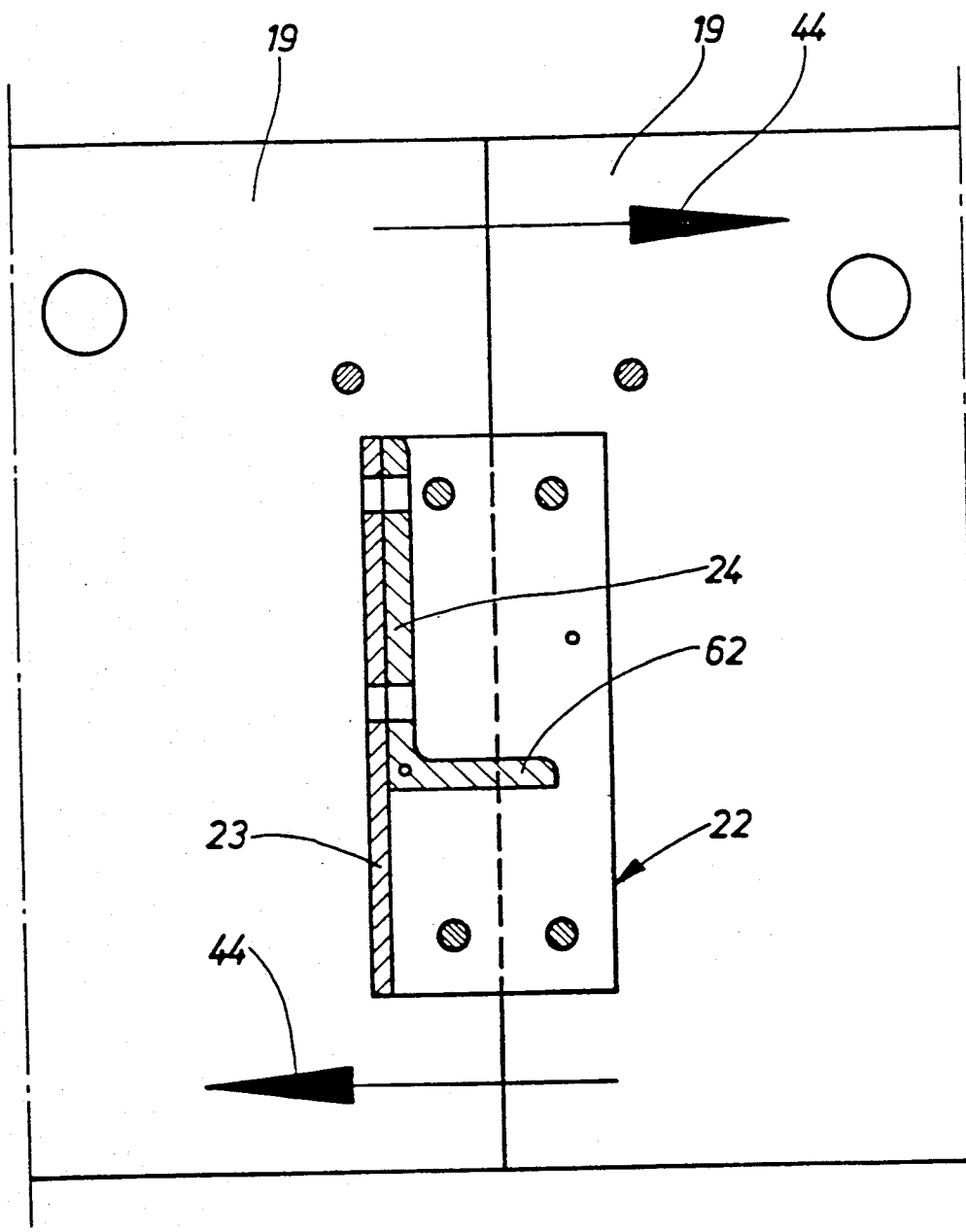
Figure 5:
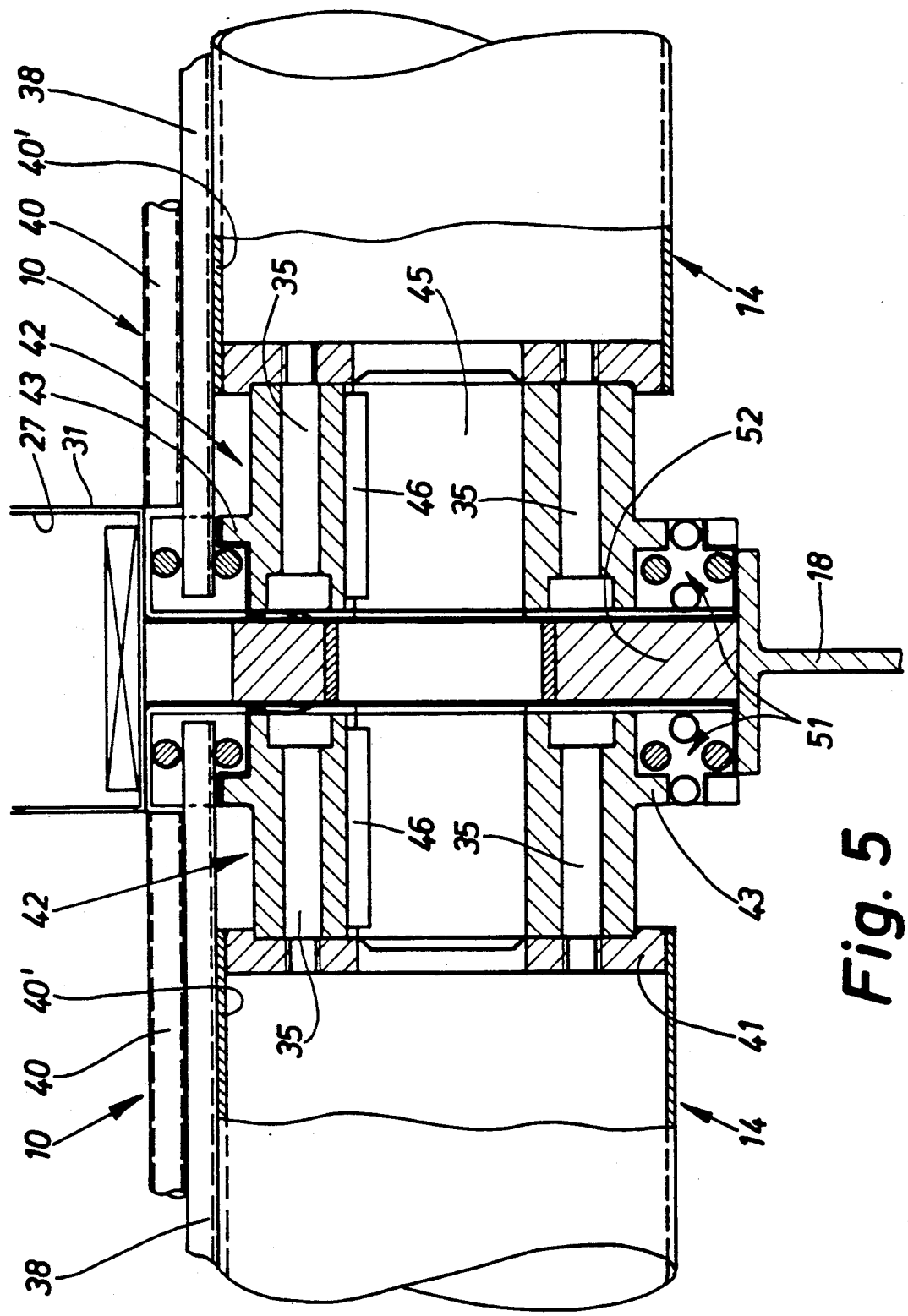
Figure 6:
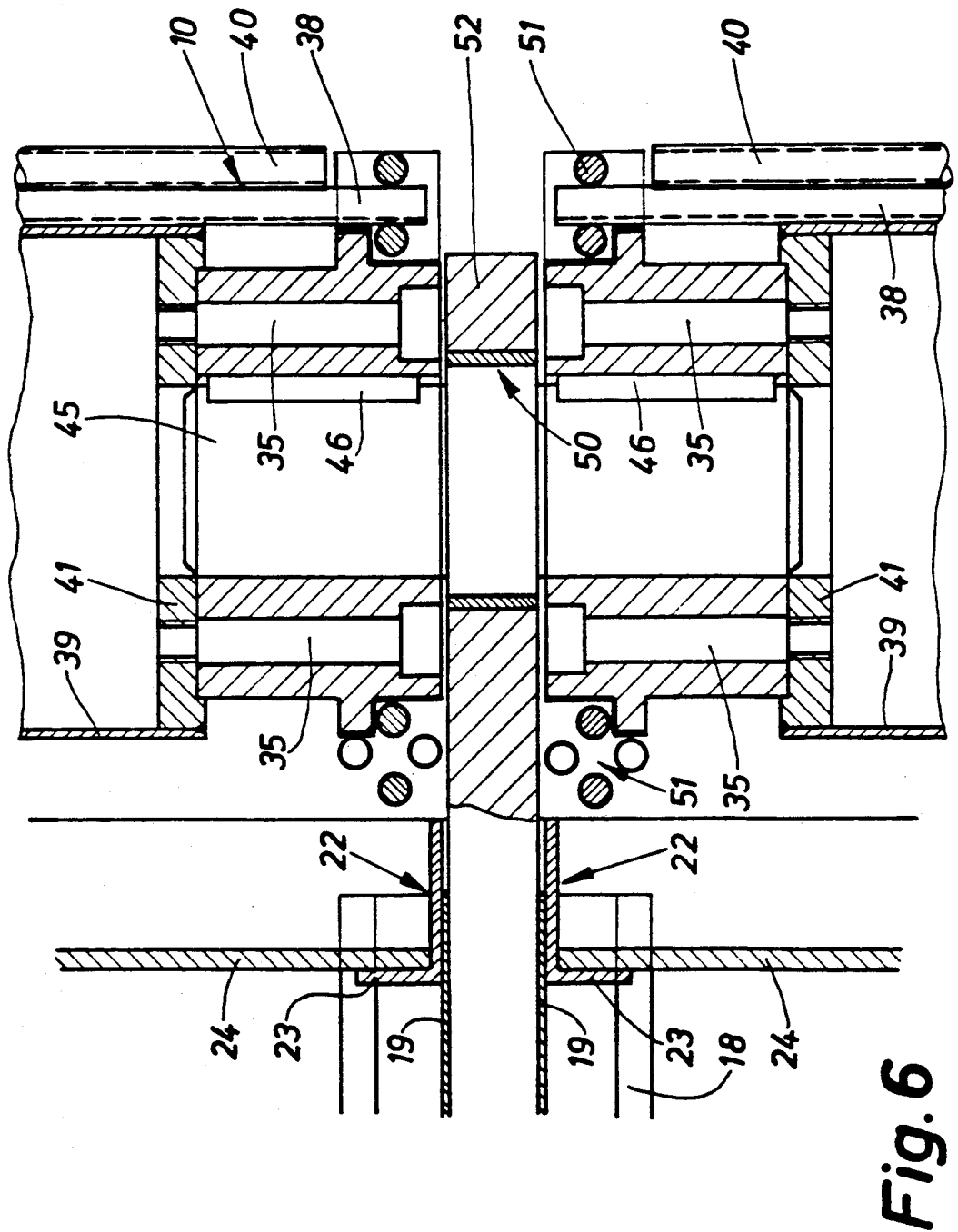
Figure 7:
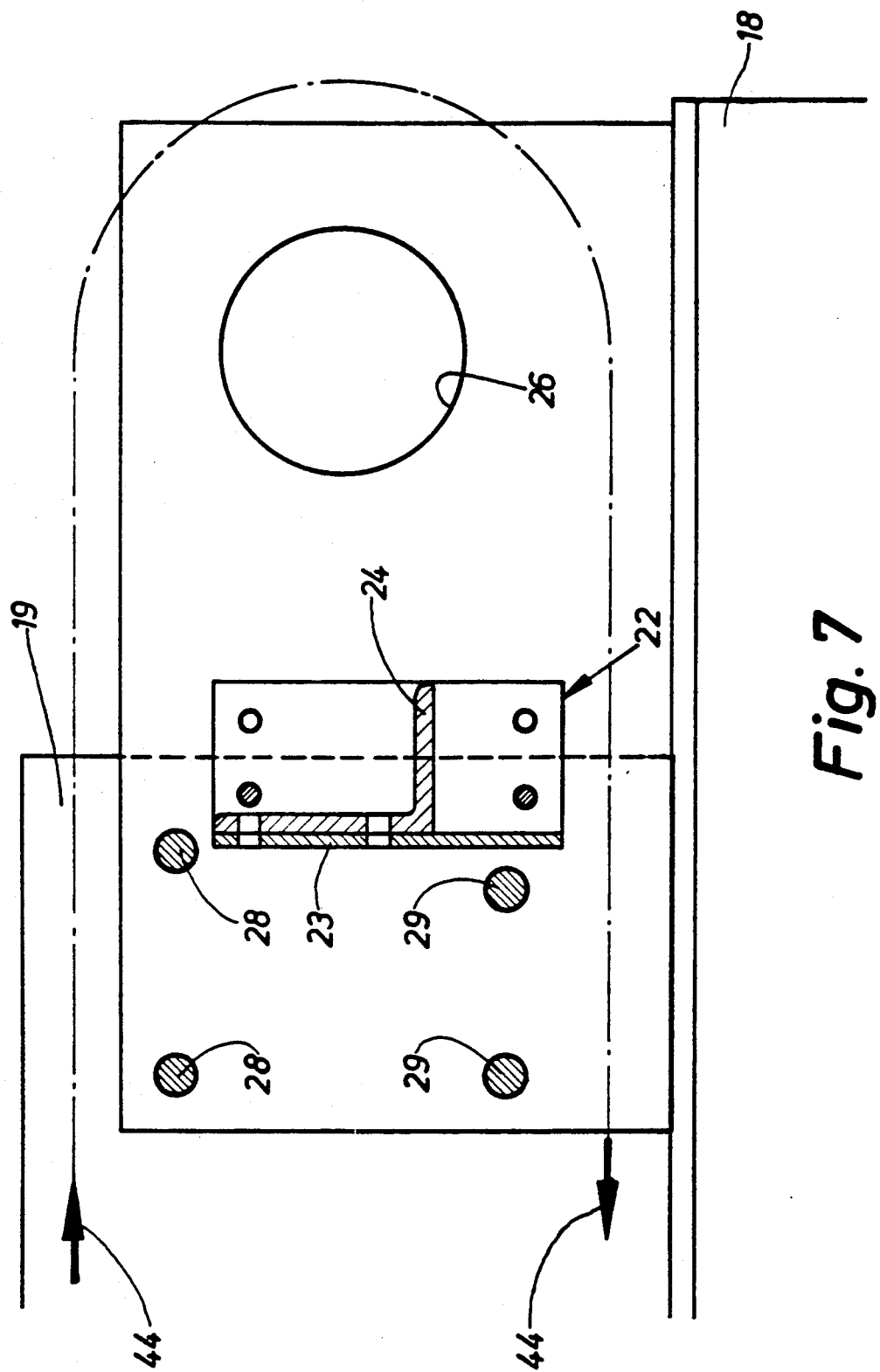
Figure 8:
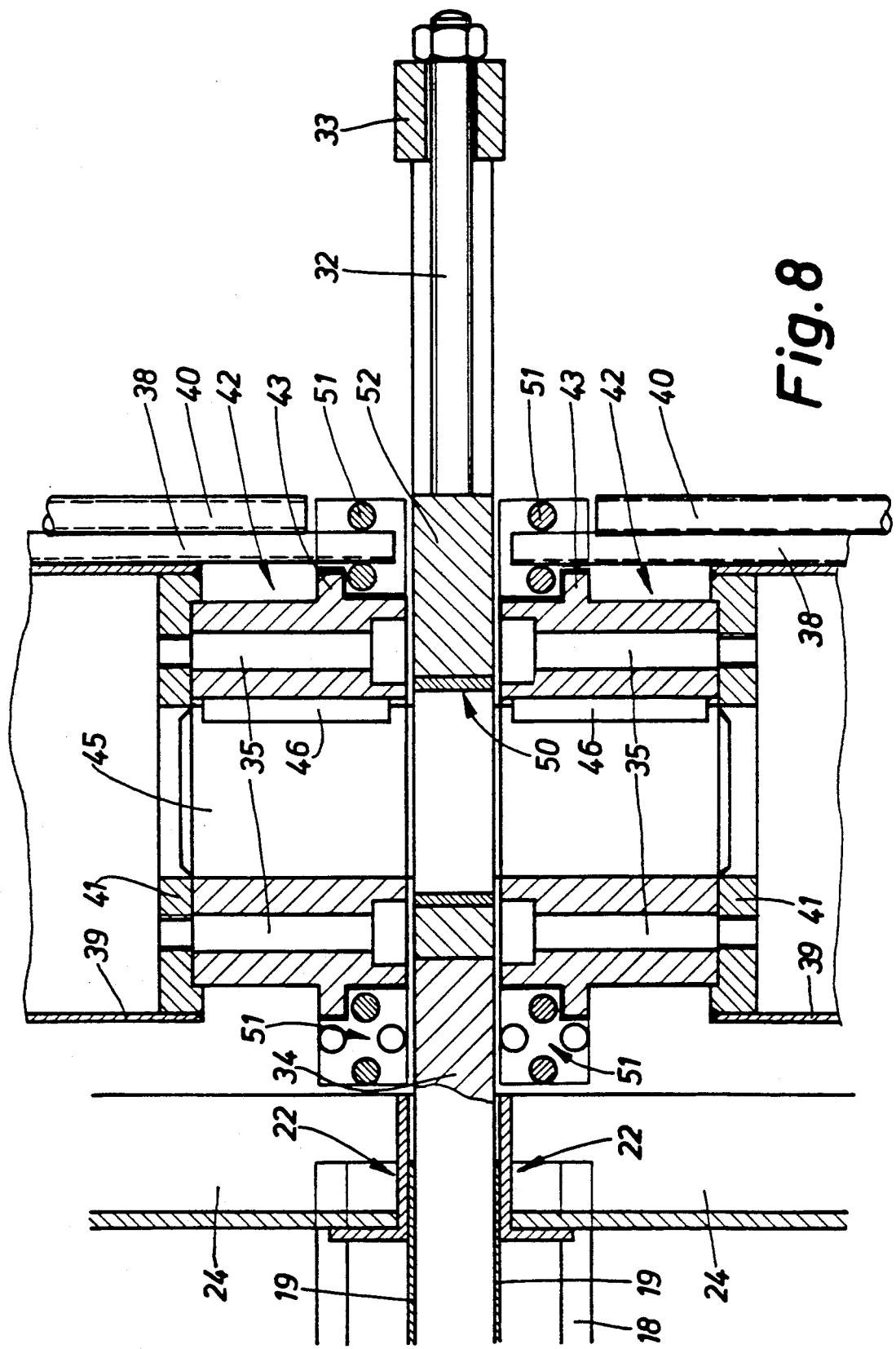
Figure 9:
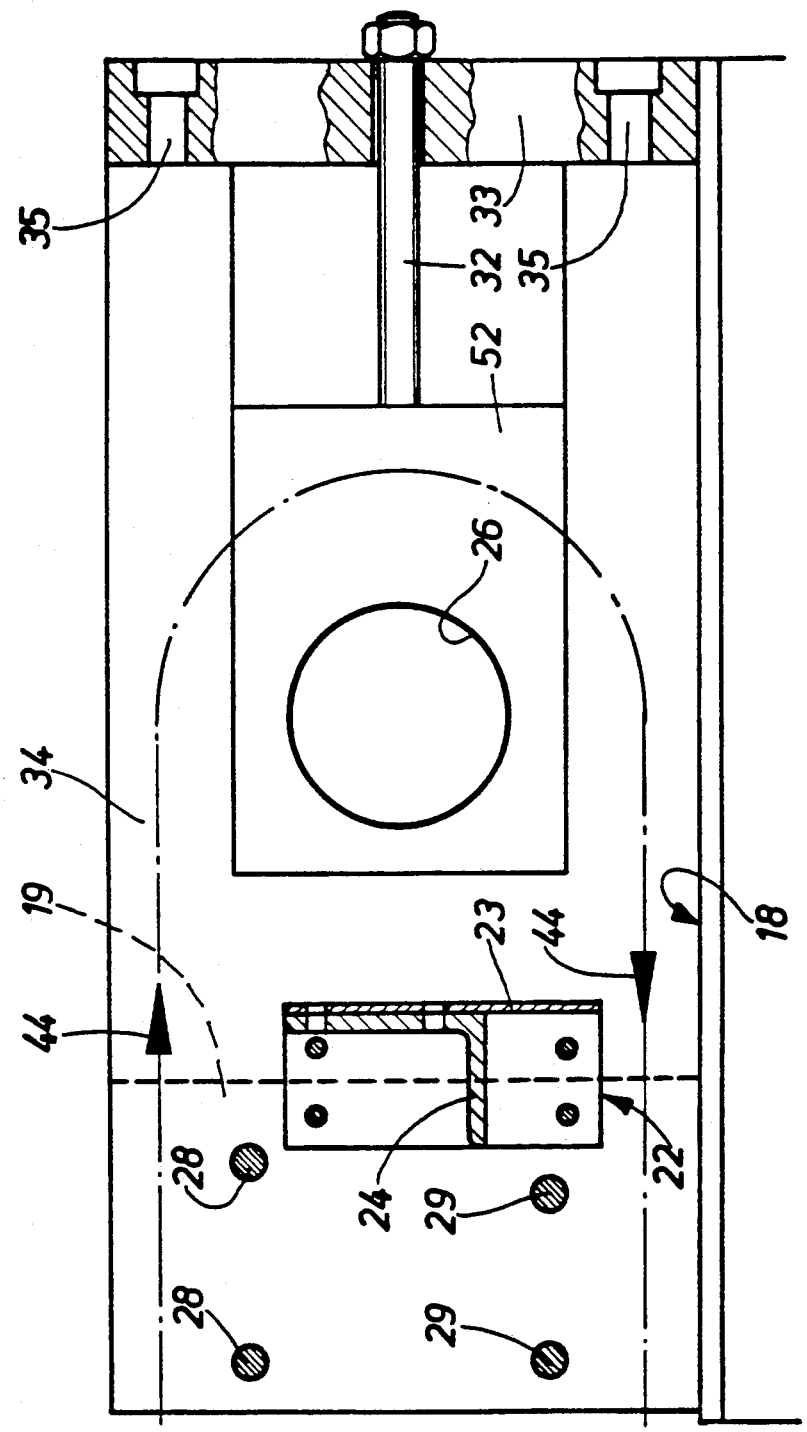
Figure 10:
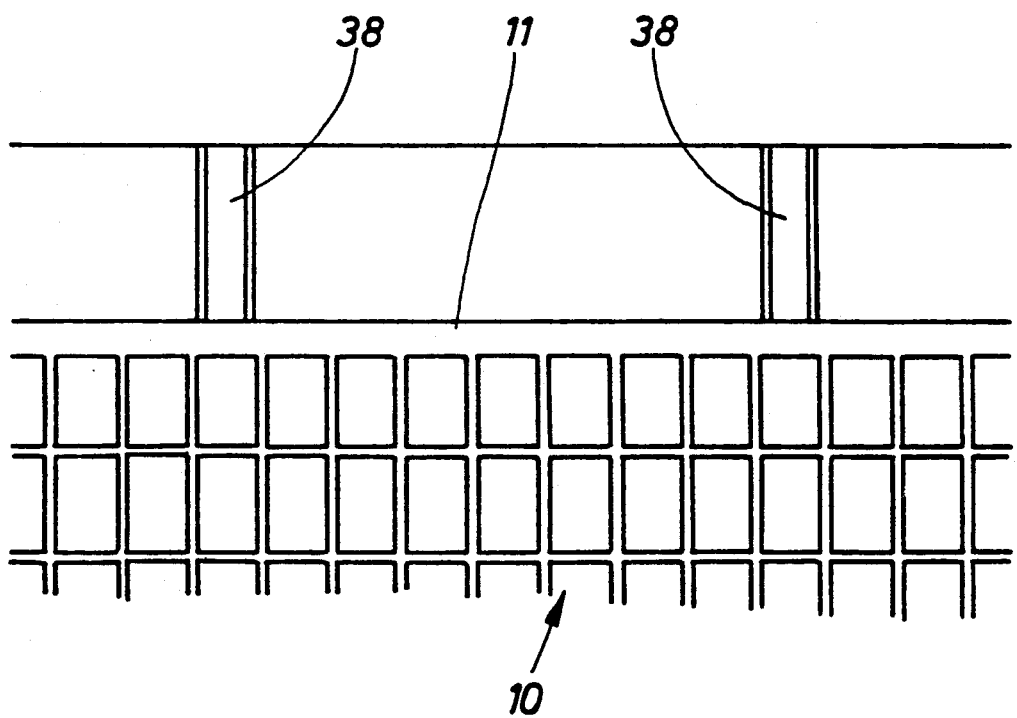
Figure 11:
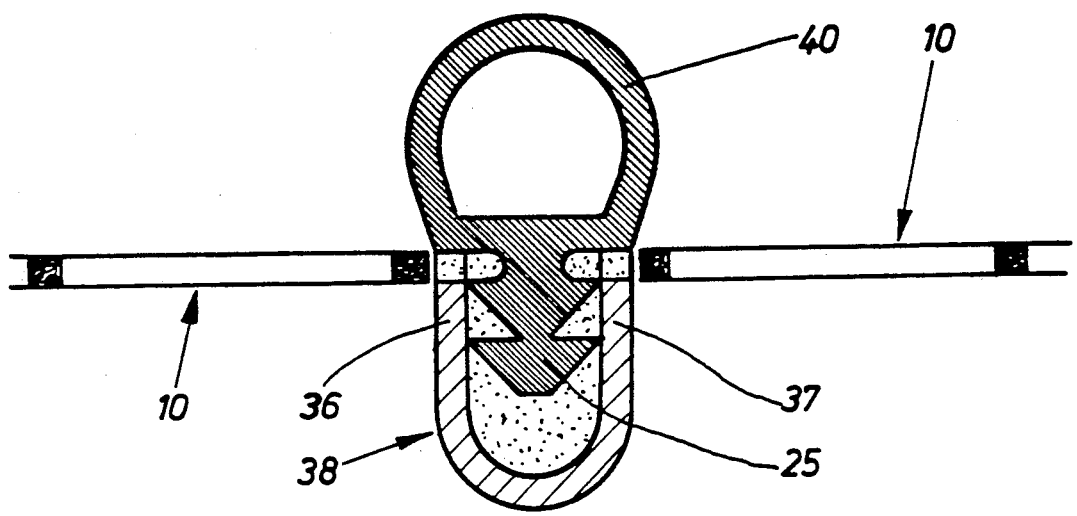
Figure 12:
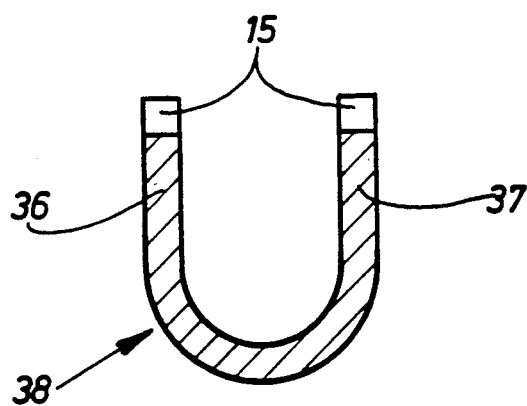
Figure 13:
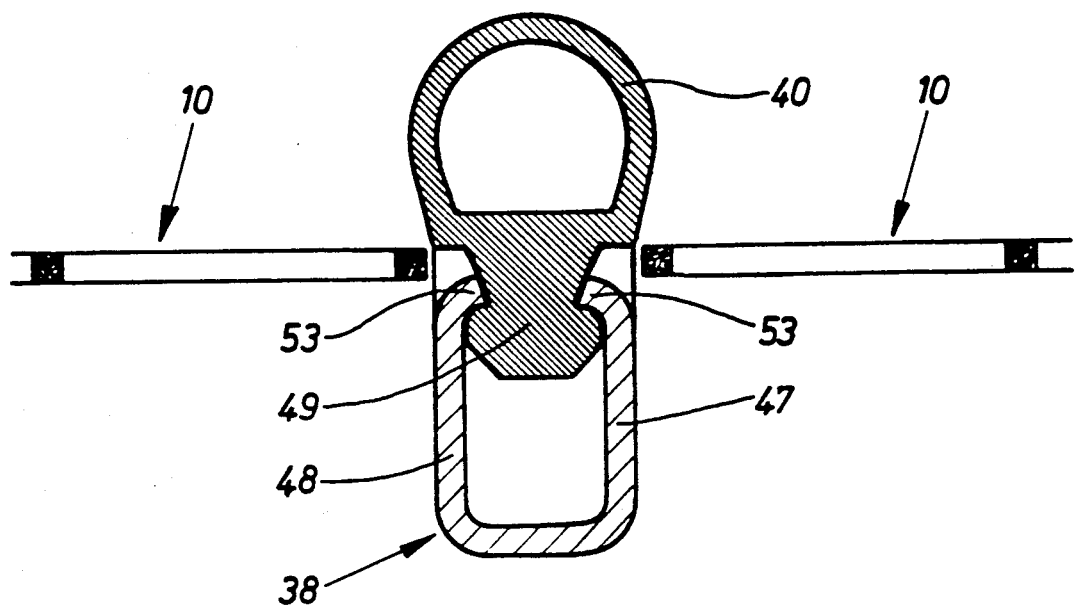
Figure 14:
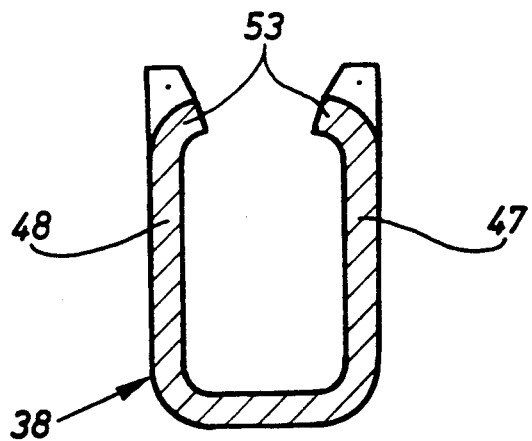
Figure 15:
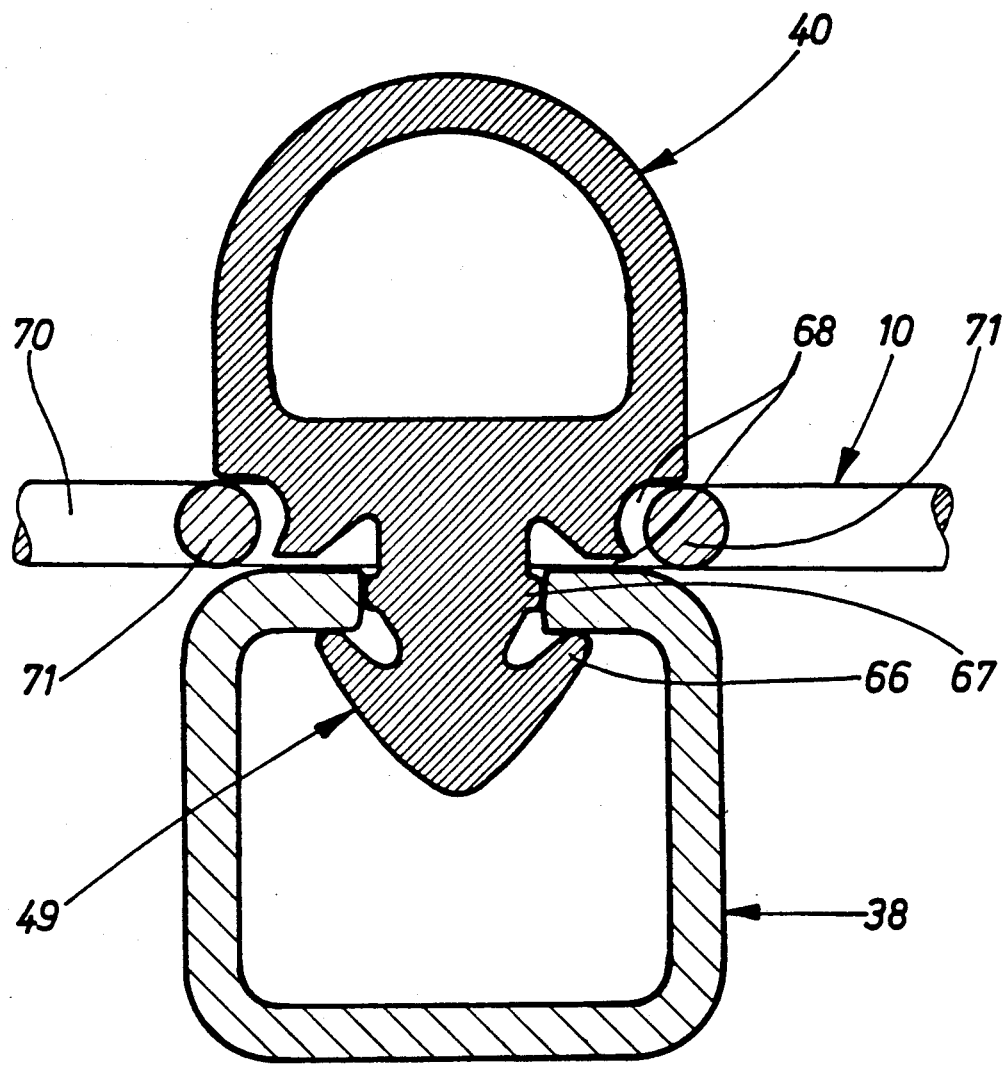
Figure 16:
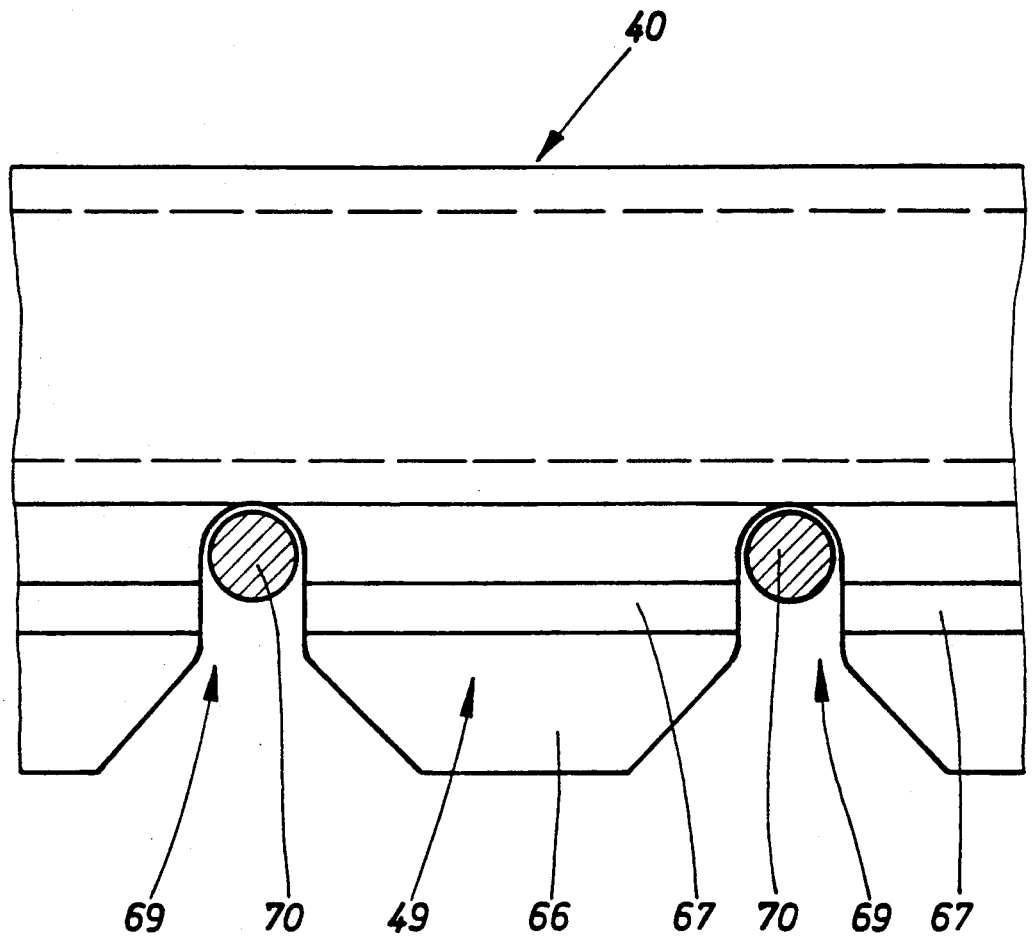
Figure 17:
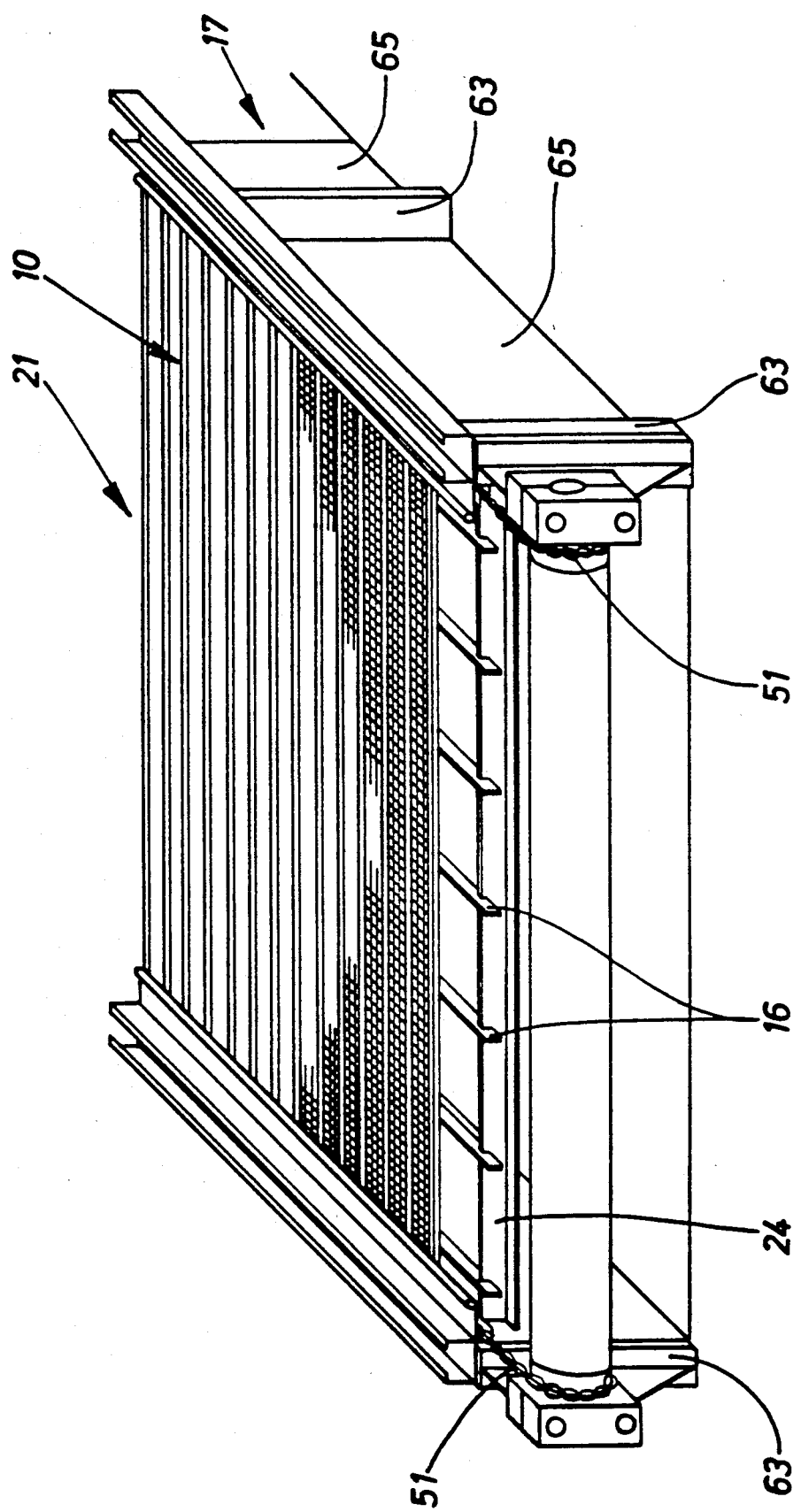
Figure 18:
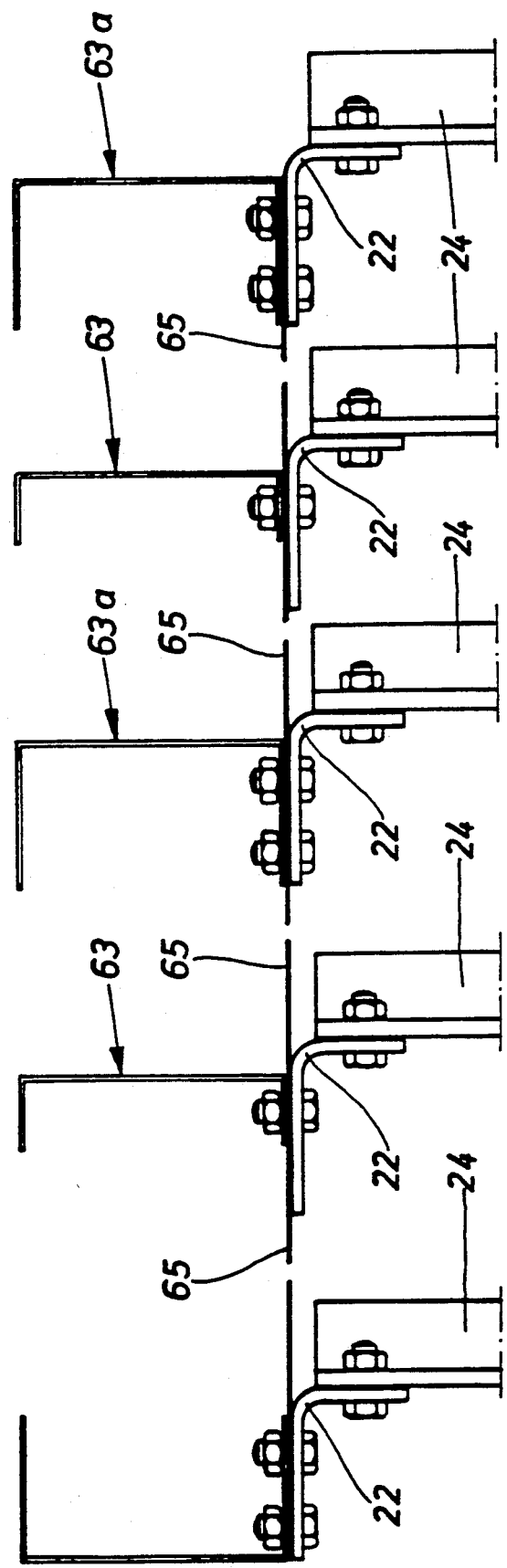
Figure 19:
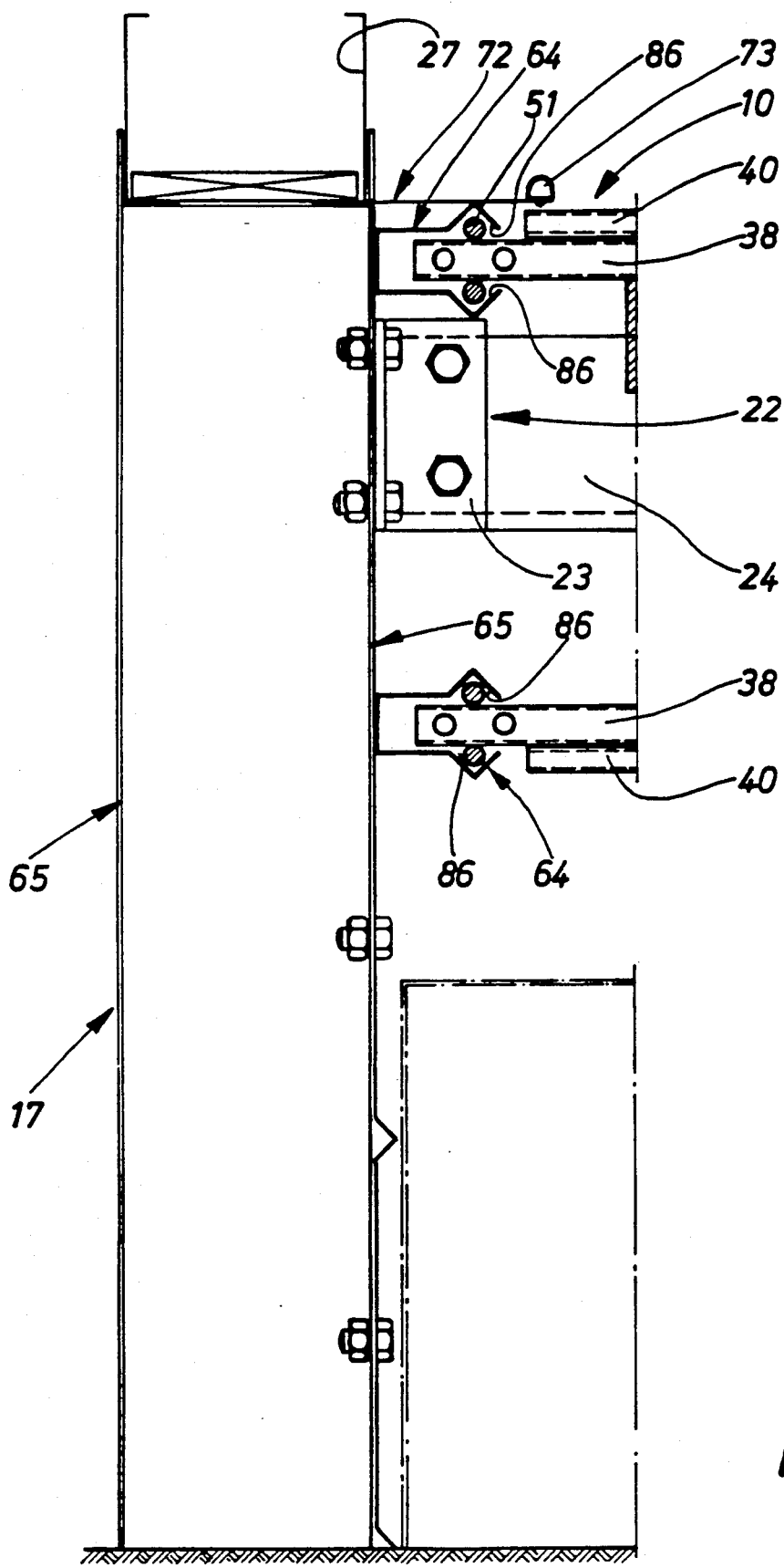
Figure 20:
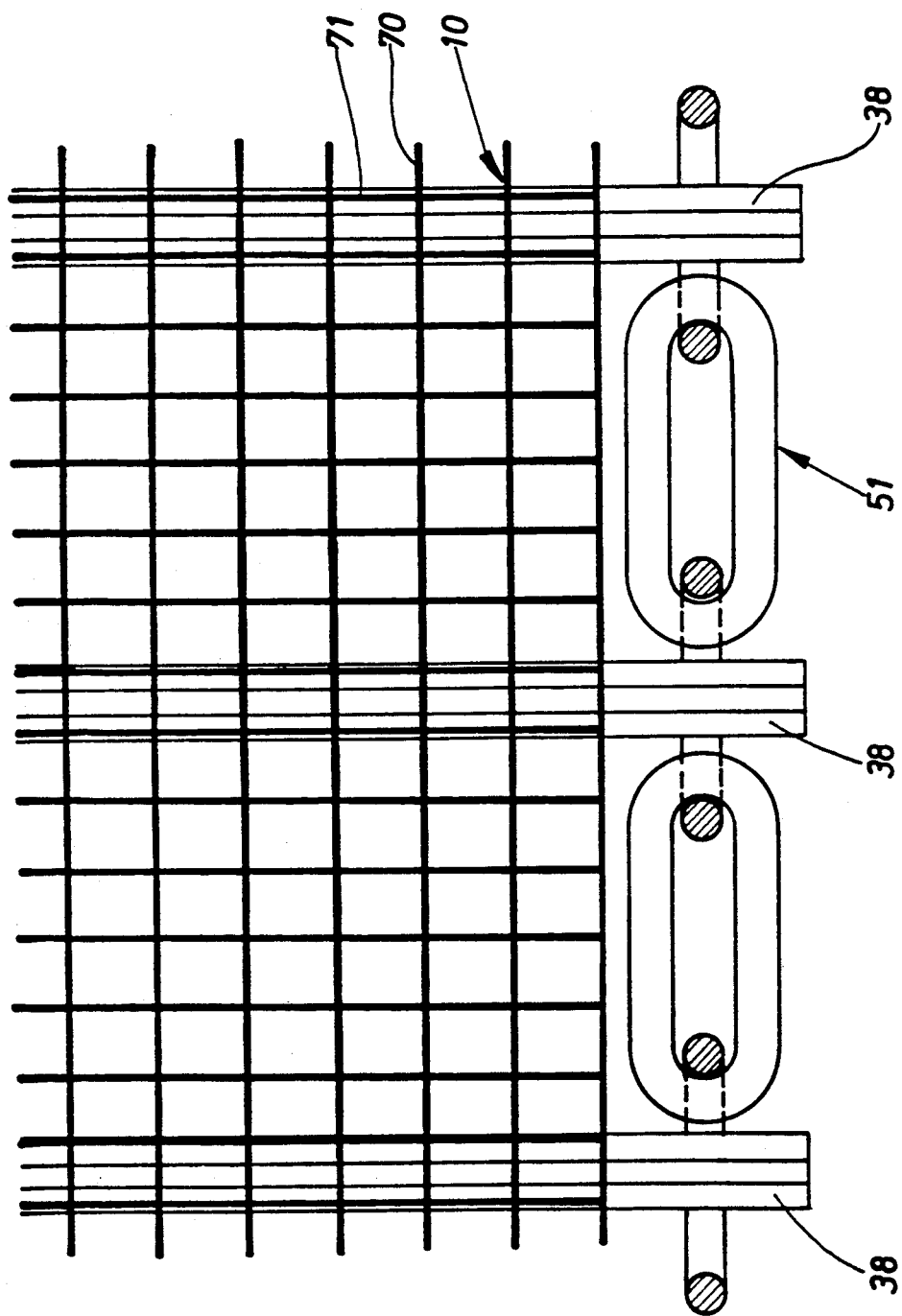
Figure 21:
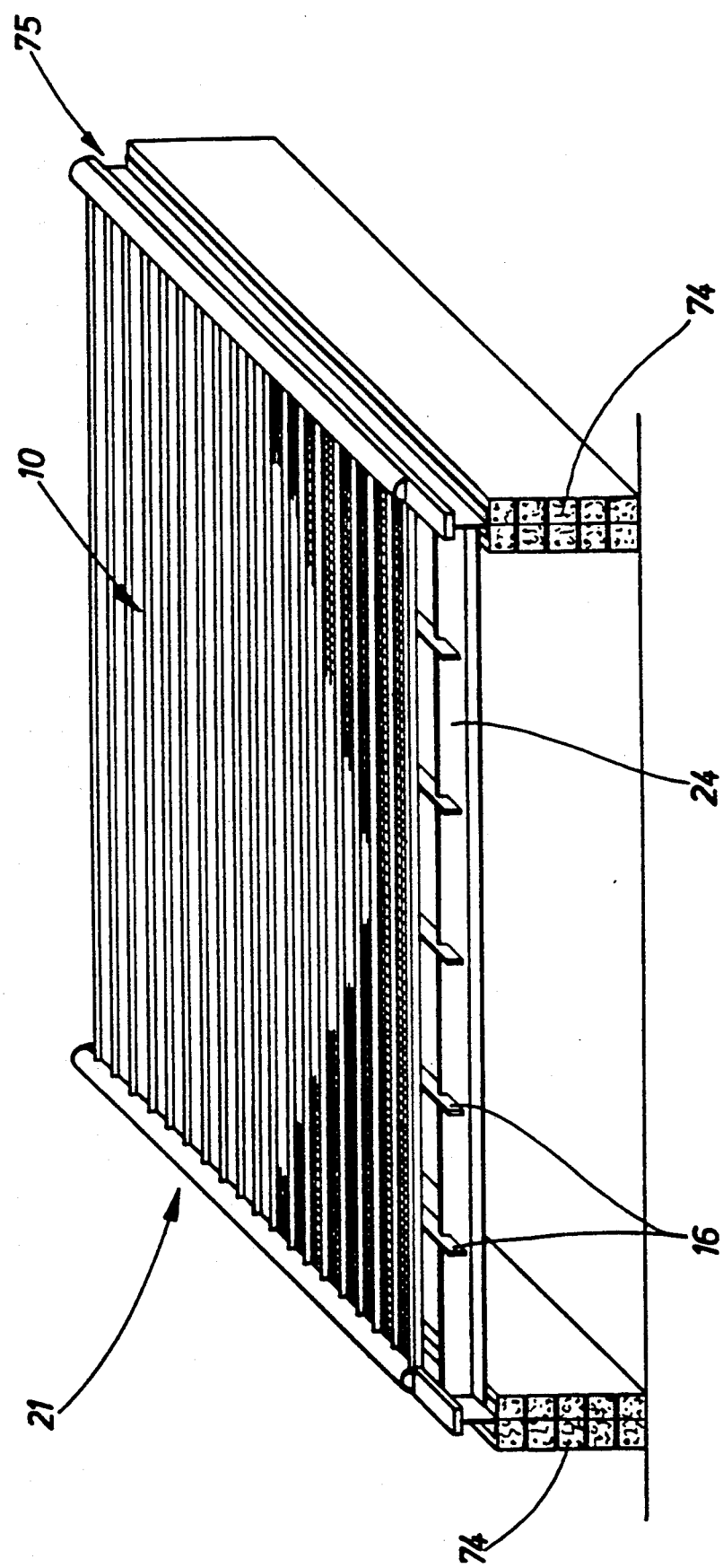
Figure 22:
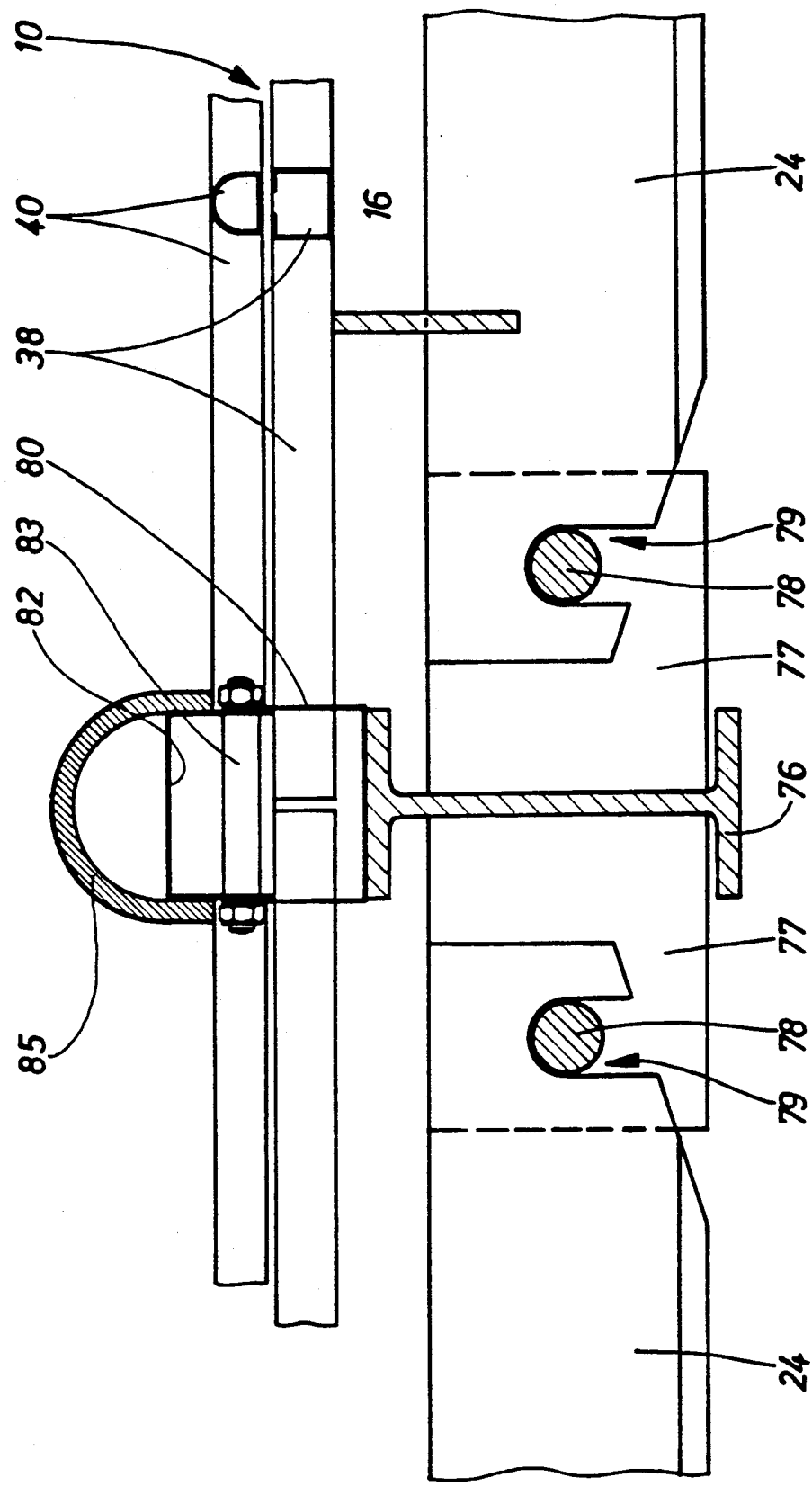

FIG. 1—a cross-section through a housing enclosure designed according to the invention, greatly simplified, FIG. 2—a cut-out of the housing enclosure and of a supporting floor corresponding to the illustration in FIG. 1 on an enlarged scale, FIG. 3—a section of the supporting means for the supporting floor on a still further enlarged scale, FIG. 4—a section of a detail of the supporting construction for the supporting floor, along line IV—IV in FIG. 3 and on a scale larger than this, FIG. 5—the support of the net floor guide drums in the drive region, in a vertical section, FIG. 6—the support according to FIG. 5, in a horizontal section, FIG. 7—the support according to FIGS. 5 and 6, in a side view, FIG. 8—the support of the net floor guide drums on the side opposite to the driving side, in a horizontal section, and depicting an effective stretching device, parallel to the conveying direction, FIG. 9—the support according to FIG. 8, in a side view, FIG. 10—a detail of the supporting floor net, in a plan view, FIG. 11—a detail of the supporting floor net on an enlarged scale, and depicting the connection between net, supporting profile and supporting profile pads, in a sectional view, FIG. 12—the supporting profile relating to the arrangement in FIG. 11, in a sectional view, FIG. 13—a detail of the supporting floor net as illustration corresponding to FIG. 11, but with modified supporting profile and supporting profile pads, FIG. 14—a section of the supporting profile relating to FIG. 13, FIG. 15—a detail of the supporting floor net as illustration corresponding to FIG. 11 or FIG. 13, but with still further modified supporting profile and supporting profile pads, FIG. 16—the supporting profile pads relating to FIG. 15, in a frontal view, FIG. 17—a modified development of an apparatus according to the invention, in a perspective representation, FIG. 18—a detail of the apparatus relating to FIG. 17, in a plan view, and on an enlarged scale, after omission of the supporting floor, FIG. 19—a detail of the apparatus relating to FIGS. 17 and 18, namely a section of the supporting means of the supporting floor on an enlarged scale, FIG. 20—a detail of the apparatus with the arrangement relating to FIGS. 17 to 19, in a plan view, FIG. 21—a still further modified development of an apparatus according to the invention with a stationary supporting floor, in a perspective representation, FIG. 22—the central supporting means of the supporting floor of the apparatus according to FIG. 21, in a sectional view and on an enlarged scale, FIG. 23—a detail of the supporting means relating to FIG. 22, in a side view, and FIG. 24—the covering for the central holding profile for the supporting floor, in a side view and in section, and on an enlarged scale.

DESCRIPTION OF PREFERRED EMBODIMENTS

FIG. 1 illustrates, in a diagrammatic cross-section, a housing enclosure for accommodating, for example, breeding chickens. Within the housing enclosure, a supporting floor 21 is located above an enclosure floor 12 at a distance from the latter. This supporting floor forms the running and standing surface for the animals. A system of tubes not depicted for supplying feed appliances 27, extending in the conveying direction, is provided above the supporting floor 21.

The supporting floor 21 as a whole, is constructed as a conveyor for the animals and—interrupted only by a center aisle—can be moved over the full width of the housing enclosure. For this purpose, the supporting floor 21 is subdivided into individual tracks, which are formed from a continuous, relatively finely meshed net 10. These are appropriately moved together and simultaneously in the conveying direction.

The ends of the net tracks run over guide drums 14 (see FIGS. 5 to 9), whereby on one side, the guide drums 14 are connected to a drive, not described in detail, whereby in this case the drive is located preferably in the region of the center aisle 13.

As represented, the supporting floor 21 consists of several individual net tracks 10 located next to one another. These tracks each are produced from reinforced threads made of relatively soft and elastic plastic, especially polyamid, whereby the reinforcement is formed by means of heavy-duty core, e.g. a textile wire or a metal wire. The diameter of the net threads is approx. 1-2 mm, preferably only approx. 1 mm. The mesh size is within the range named in the introduction, preferably 12 mm×15 mm.

The so-constructed net track is guided over transversely directed supporting profiles 38 while at the same time bound to these. The connection between the net track or supporting floor net 10 and the supporting profile 38 is effected by means of form-locked and force-locked fixing of the net 10 between the supporting profile 38 and a pad assigned to it, and which is located on the upper side of the supporting floor 21, defined by the net 10, above the assigned supporting profiles 38, respectively. In the present case, the pad is formed by a tube or hose shaped hollow profile 40 (see FIG. 11 or 13).

Corresponding to the development according to FIGS. 11 and 12, the supporting profiles 38 are each U-profiles, open at the top, and made of plastic, metal, especially high-grade metal, or the like, and between their legs 36 and 37 are anchored the pad, here hollow profile 40, assigned to each supporting profile, while simultaneously fixing the supporting floor net 10 between supporting profile 38 and pad, namely hollow profile 40. For an integral anchoring of the net 10 between supporting profile 38 and pad or hollow profile 40, the upper edges of the U-profile's legs 36, 37 as well as the pads anchored between these legs have slots, through which the longitudinal threads of the supporting floor net 10 are extended when in the assembled state. In FIG. 12 the edge provided on the upper edges of the U-profile's legs 36, 37 are designated with the reference number 15. These legs with their corresponding pad slots are open at the bottom and located in the anchoring region 25 of the pads. The distance the indicated slots are spaced apart corresponds to the distance the longitudinal threads of the supporting floor net 10 are spaced apart. The width of each of the slots is approx. 2 mm, so that the longitudinal threads of the supporting floor net 10 can be placed without problem within the slots 15, open at the top, at the upper edges of the U-profiles 36, 37 and within the pad, open at the bottom, in the region of the anchoring portion 25 of the supporting profile pads. In the assembled state, the edge pad of the supporting profiles and the slots, open at the bottom, in the anchoring region 25 of the supporting profile pads are aligned together in the conveying direction, i.e. in the direction of the net's longitudinal threads.

As already stated above, the supporting profile pads encompasses a tube or hose shaped hollow profile 40, which extends across the upper side of the net 10, that is, continuously and transversely across the net track. The mean outer diameter of the hollow profile 40 is approx. 10-11 mm. The wall thickness is approx. 1.5 mm. The hollow profile 40 preferably consists of silicon rubber with a Shore hardness of 60 degrees. On the bottom side of the hollow profile 40 an anchoring region or section 25, barbed in cross-section, is upstretched. During assembly, this region is brought to the region between the two legs 36 and 37 of the supporting profile 38, constructed as a U-profile, whereby the region between the two legs 36 and 37 is filled with silicon adhesive prior to this. After the adhesive has hardened suitably, a close and permanent bond between the described supporting profiles 38, on the one hand, and supporting profile pads, on the other hand, is attained while the supporting floor net 10 between supporting profile 38 and pad 40 is fixed. The supporting floor net penetrates the unit supporting profile 38 and assigned supporting profile pad 40. At the front ends, the hose-shaped pad 40 is closed, for example, by means of flattening, adhesive bonding, welding, or the like.

The supporting floor nets or net tracks 10 are operatively connected to lateral conveying agents in the form of open-link chains 51. The operative connection is achieved in that the open ends of the supporting profiles 38 are inserted into the vertical chain links of the open-link chains located at both ends of each net track 10 and are anchored by means of a split pin, or the like. This type of operative connection between supporting floor net or net track 10, on the one hand, and open link chains 51, on the other hand, probably is of the simplest construction.

The upper stringer of the net tracks 10 is supported by at least two guide profiles, here flat irons 16, located on the longitudinal edge side, which overlap at their contact points. During transport of the track or supporting floor net 10, the supporting profiles 38 glide along these guide profiles. To reduce the gliding friction and for noise reduction, the upper side of the flat iron 16 can be provided with a plastic coating, preferably interchangeable.

The ends of the supporting floor net 10, to be joined to one another, are each provided with a textile edge 11 (see FIG. 10), at which the contact connection is formed, while a continuous net track is created.

Also of special interest is the support of the supporting floor 21 outside of the housing enclosure floor 12. For this purpose, supporting structures 17, extending in the conveying direction, are provided at both sides of each net track 10. The supporting structures 17 each are formed corresponding to FIG. 3, by means of an I-girder 18, upon which two vertical sheet metal plates 19 are mounted, for example, screwed on, and the lower longitudinal edges of which are constructed as lateral chain guiding profiles 20 and on each of the upper, butt-ended, longitudinal edges of which a holding 31 for a feed appliance 27, extending in the conveying direction, is connected, especially welded on. The crossbar of the I-girder 18, extending in the conveying direction, rests on the enclosure floor 12 and is connected to it preferably by screwing on. The two vertical sheet metal plates 19 are fastened to the upper crossbar of the I-girder 18, also preferably by means of screwing. The lower chain guide profiles 20 are so constructed that they support the vertical and also the transversely extending chain links of the open-link chains 51, that is, in a downwards direction and in a lateral direction. To suitably support the uper stringer of the open-link chains 51, chain guide profiles 30 also are arranged, namely screwed on, laterally at the top of the sheet metal plates 19. The chain guide profiles 30 are constructed as so-called poker profiles or double-angle profiles.

The sheet metal plate 19 of each supporting structure has a length that is less than the total length of the supporting floor 21. The so-constructed sheet metal plates are butt-joined to one another, whereby the connection is effected by L-angles, extending vertically (see FIGS. 3 and 4), on the legs 23—projecting laterally inwards—to which transverse girders 24 are connected, which effect a transverse bracing of adjacent supporting structures 17. In this way, an extremely stable and/or stiff supporting frame is obtained for the supporting floor 21. The upper chain guide profiles 30 extend between the transverse girders 24 and the holding 31 for the feed appliance 27, each preferably so closely underneath said holding 31 that the (vertical) chain links are freely movable between the chain guide profile 30 and the holding 31 for the feed appliance 27 (see FIG. 3).

The connecting angles 22 are screwed to the abutting sheet metal plates 19, as seen in FIG. 4. The transverse girders 24, serving as lateral reinforcement, also are screwed onto the legs 23, projecting laterally inwards, of the L-angles 22 (see FIG. 4 here, too).

Arranged at the ends of the supporting floor 21 are support and drive for the supporting floor nets 10 and the open-link chains 51 assigned to them. The supporting floor nets or net tracks 10, together with supporting profiles 38, which are spaced apart preferably approx. 9 cm in the conveying direction, are guided over guide drums 14 at the supporting floor end. Said guide drums each have, at their front side, chain wheels 42 for deflecting the open-link chains 51 assigned to the supporting floor nets or net tracks 10. The support of the guide drums 14 is effected on the lateral supporting structures 17. The guide drums 14 of adjacent supporting floor nets or net tracks 10 located at the same end of the supporting floor 21 are arranged coaxially to one another and are reinforced by a common pivot bearing 50, which is constructed on the common supporting structure 17 (see FIGS. 5 to 9). FIGS. 5 and 6 show the common support of the supporting floor nets or net tracks 10 adjacent to the guide drums 14 in the driving region 60, whereas FIGS. 8 and 9 show the corresponding support on the side opposite to the driving side, which is provided additionally with a net-stretching device. To simplify the representation, corresponding parts of both of these supports are provided with the same reference numbers.

Consequently, the guide drums 14 are each formed by a tube 39, which is closed at the front side by terminal flanges 41. A chain wheel 42 is connected to each of these terminal flanges 41. The teeth of said chain wheel mesh with the chain links which extend parallel to the net track plane. In the region of the chain wheels 42, the lateral guidance of the vertical chain links is effected by a ring projection 43 arranged on the chain wheel 42. The chain wheels 42 are connected to the terminal flanges 41, in each case by several screw bolts 35 arranged in an even distribution over the circumference.

As stated above, adjacent guide drums 14 have a common pivot bearing 50, which is located in the region of the common supporting structure 17. The common pivot bearing 50, in each case is formed by a bearing bolt 45 and a bearing body 52 assigned to it, which joins the adjacent guide drums 14 torsionally firm to one another. The bearing body 52 is integrated in the supporting structure 17. The torsionally firm connection between the two guide drums 14, on the one hand, and the bearing bolt 45, on the other hand, is effected by means of adjusting springs 46, which are located between the bearing bolt 45 and the two chain wheels 42, facing one another. This embodiment permits a simple mounting of the guide drums 14 onto the common bearing bolt 45. Thus, assembly of the apparatus by sectors is possible by simply mounting one part onto another and screwing them together.

The bearing bolt 45 is glide-supported in the bearing body 52. Of course, use of roller bearings is also possible. In the represented embodiment, the bearing body 52 is a relatively flat metal plate with a continuous bore 26, the peripheral are of which defines the friction bearing area. This base plate is fastened by means of screw bolts 28, 29 on the supporting structure 17, in the region between two vertical sheet metal plates 19, whereby bracing is effected in a downwards direction on the continuous I-girder 18 (see FIGS. 5 and 7).

The common support of adjacent guide drums 14 at the end of the supporting floor 21 opposite to the driving side, is diagrammatically represented in FIGS. 8 and 9. This support differs from the support described in FIGS. 5 to 7 only in that the bearing body 52 is adjustable in a direction parallel to the conveying direction, while the supporting floor net or net track 10 is under suitable tension or stress.

For this purpose, the bearing body 52 is constructed as a slider, which can be adjusted in the direction parallel to the conveying direction of the supporting floor 21, with the aid of a tightening screw 32. The support of the tightening screw 32 is effected on the common supporting structure 17, that is, over a crossbar 33 and a yoke plate 34 fastened to the supporting structure 17, which is connected to the supporting structure 17 in the same way as is the bearing body 52 in the embodiment according to FIGS. 5 to 7. Within the yoke plate 34, the bearing body 52 is supported such that it can be moved back and forth. Crossbar 33 and yoke plate 34 are screwed together by means of screw bolts 35, extending parallel to the conveying direction. The guide motion of the supporting floor net or net track 10 is indicated by arrows 44 in FIGS. 7 and 9. Likewise, the guide motion of the supporting floor net or the net track 10 is represented by arrows 44 in FIGS. 4 and 7.

On the outside lateral edges of the supporting floor 21 the support of the guide drums 14 is formed corresponding to the described support, that is, as a simple and not a double support, as represented in FIGS. 5 to 9.

At a pitch diameter of the chain wheels 42, connected to the guide drums 14, of approximately 140–150 mm the chain wheels 42 each have approximately 5 teeth. The external diameter of the guide drums 14, with the stated dimensioning of the chain wheels 42, is approximately 135 mm. The width of the supporting floor net, then, is approximately 2 m. The support of the upper stringer of such a wide net floor is effected by six flat irons 16 of the type described (see FIG. 2), arranged equidistantly from one another.

As opposed to the embodiment of the supporting profile 38 according to FIGS. 11 and 12, the supporting profile according to FIGS. 13 and 14 is slightly modified. Instead of the connection by gluing of the pad profile 40 on the upper side, with the embodiment according to FIGS. 13 and 14, a form-closed spring or snap connection between the supporting profile 38, on the one hand, and an anchoring section 49 tip-stretched on the bottom side of the hollow body profile 40, on the other hand, is provided. The supporting profile 38, constructed U-shaped in cross section, is provided with spaced noses or projections 53, molded inwards. In the mounted state, these noses clampingly grasp behind the close-fitting anchoring section 49. An adhesive connection can be omitted with this embodiment.

With the embodiment according to FIGS. 15 and 16 the supporting profiles are constructed as C-profiles. Similarly to the embodiment according to FIGS. 13 and 14, a form-closed snap connection between the supporting profile, on the one hand, and an anchoring section 49 tip-stretched on the bottom side of the hollow body profile 40, on the other hand, are provided. This snap connection spans, diametral to the longitudinal center plane, tip-stretched supporting lips 66, which, in the assembled state, rest against the inside of both legs of the C-shaped supporting profile 38, while the hollow body profile 40 is clamp-fixed on the supporting profile 38. In the region of the aperature-slot between the two legs of the C-shaped supporting profile 38 there are sealing lips tip-stretched on the anchoring section 49 of the hollow body profile 40 diametral to its longitudinal center plane. By means of the slit areas, designated in FIG. 15 by the reference number 68, differences in tolerance in the supporting floor net 10 can be equalized. Moreover, this makes forcing of the hollow body profile 40 from above into the supporting profile 38 possible until it is anchored to this profile.

According to FIG. 16, the anchoring section 49 of the hollow body profile 40 is provided with clearances 69 arranged longitudinally spaced from one another, whereby the spacing corresponds to the mesh width of the supporting floor net 10. In the assembled state, the longitudinal threads 70 of the supporting floor net 10 extend through these clearances 69. The cross threads 71 of the supporting floor net 10 are represented in FIG. 15. In the region of the supporting profiles 15 or hollow body profiles 40, these threads are assigned to lateral clearances of said profiles, while taking into consideration the above mentioned play 68 for tolerance equalization.

Also to be noted concerning the above mentioned structure of the guide drums 14 is that the bearing body 52 on the driving side, preferably has a divided structure, that is, with one plane of division extending approximately vertically, whereby the half facing the supporting floor 21 is firmly connected to the apparatus, whereas the bearing half facing outwards is detachably fixed by means of screws.

Analogous to the structure to the conveyor chains 51 the chain wheels 42 can also be constructed as simple gear wheels.

The guide drums arranged on the side opposite to the driving side, are tensible, preferably independent of one another, by reason of having each guide drum assigned a special stretching device with stretching support. In this case the guide drums, of course, are pivotally supported independent of one another. In this manner, differing size tolerances of the conveyor chains can be equalized.

On the basis of FIGS. 17 to 20 another embodiment of the apparatus according to invention is explained in more detail, whereby the parts already described, relating to prior embodiments, and designated with the same reference numbers, are not stated to avoid repetition.

The embodiment according to FIGS. 17 to 20 differs from the previously described embodiment particularly by the differing support of the supporting floor 21. The support is effected by supporting brackets 63, 63a, arranged spaced from one another in the conveying direction, which are connected to one another by butt-connected sheet metal plates 65, similar to the embodiment according to FIGS. 3 and 4, whereby the transverse bracing of adjacent supporting structures of this type is also effected by transverse girders 24 in accordance with the representation in FIGS. 3 and 4. In this way, a similarly stable or stiff supporting frame for the supporting floor 21 is obtained as described in the preceding embodiment. According to FIG. 18, every other supporting bracket is constructed with wider legs, which serve for the butt-connection of the sheet metal plating 65.

Furthermore, the embodiment according to FIGS. 17 to 20 differs from the embodiment described precedingly by the differently formed chain guide. As FIG. 19 very clearly shows, both the upper stringer and the lower stringer of the chain 51 assigned to the supporting profiles 38 are guided within U-shaped chain guide profiles 64, which are fastened, namely screwed on the supporting structure 17 in the conveying direction. These chain guide profiles each have guide tracks facing one another for, in each case, the vertical chain links, whereby with the embodiment represented, the cross-section of the guide tracks 86 is, in each case, formed as a right angle. In practice, the vertical brackets 63, 63a each are spaced apart from one another from apporoximately 1.2 to 1.8 m, especially approximately 1.5 m. The connection between the supporting profiles 38 and the conveyor chains 51 is effected in a manner similar to that of the precedingly described embodiment.

To be noted also is that the preferred construction of the net track 10 is as follows:

In the weft direction: highly durable polyester monofilthreads (7 strands with thread spacing 12.86 mm); in the warp direction; highly durable polyester multifilthreads (5 strands; thread spacing 17.55 mm).

The so-constructed net preferably is provided with a covering made of soft PVC, by means of submerging in a PVC-paste.

On the upper side of the supporting structure 17, i.e. on the upper front sides of the supporting brackets 63, 63a, a feed appliance 27, extending in the conveying direction, is fastened. It has been determined that this feed appliance, because of its structure, is too larger and, as a rule, built too high for small animals after placement in the enclosure. Moreoever, not inconsiderable feed losses have been established, because larger animals throw feed out of the appliance 27. For this purpose, next to the feed channel 27 there is arranged a feed catch plate 72, also continuous and extending horizontally, as diagrammatically represented in FIG. 19. This feed catch plate 72, of course, is suited and intended for the precedingly described embodiment. The longitudinal edge of the feed catch plate 72, facing away from the feed appliance 27 is provided with an elastic padding strip 73, corresponding to the hollow body profile for the supporting profile 38. The feed catch plate 72 is used as feed channel for the smallest animals. For the larger animals the feed catch plate serves for catching feed thrown out of the appliance 27, thereby considerably reducing feed losses. The feed catch plate 72, in accordance with FIG. 19, extends down to the supporting floor 21 or net track 10.

On the basis of FIGS. 21 to 24, an embodiment with a stationary supporting floor 21 is described, which also is defined by a continuous net track 10 of the type described. This embodiment is suited for breeding animals, which remain in the housing enclosure for a longer period of time, e.g. roosters and hens or ducks. In this case, the expesne of a movable supporting floor is not required.

Correspondingly, with the latter embodiment a rectangular frame 75 is positioned on pedestals 74, spaced apart from and extending parallel to one another. The frame 75 serves as a base for the supporting floor 21. This frame may be similarly large in dimension as in the preceding embodiments. Moreover, the base construction of net 10/supporting profiles 38 and hollow body profiles 40 is carried out in the same way as in the embodiments according to FIGS. 1 to 20.

The frame 75 is defined by double-T profiles 76, which rest on the pedestals 74 and which are connected to one another by transverse girders 24, arranged spaced apart from one another. Thus, the transverse girders 24 are constructed as L-profiles. These profiles are spaced apart approximately 2.5 to 3.5 m, preferably approximately 3.0 m. According to FIGS. 22 and 23, double-lashings 77, in each case, welded on the crosspiece, especially on the sides of the double-T profile's crosspieces facing one another and spaced apart from one another at the distance stated. Between thse double lashings, the vertical leg of the transverse girfers 24 can be fit. The double tabs 77 are in each case penetrated by a supporting bolt 78, in a cross direction, upon which the transverse girders 24 are suspended. For this purpose, the cross-legless ends of the transverse girders 24 in each case have clearances, open at the bottom, according to FIG. 22. When the double-T profiles 76 are solidly mounted onto the pedestals 74, the transverse girders 24 can be swivelled or folded up around the supporting bolts 78. Priro to this, the net-type supporting floor 21 naturally must be removed, i.e. rolled up. This provides easy accesibility of the supporting floor between adjacent pedestals 74 for cleaning purposes. With the arrangement of a center pedestal 74, the supporting structures assigned to this pedestal are, in each case, folded up on the double-T profile 76, also assigned to this pedestal, and then they are bound to one another and kept in this folded up position. This makes possible cleaning of the housing enclosures from both sides of the center pedestal at the same time.

As already explained above, the supporting floor 21 is constructed corresponding to the precedingly described embodiments, i.e. with supporting profiles 38, net track 10 and the padding or hollow body profiles 40, assigned to the supporting profiles 38. According to FIG. 22, no more hollow body profiles are assigned to the front ends of the supporting profiles 38. The ends of the supporting profiles freed from these hollow body profiles 40 find reception in assigned holding profiles 80, which are fastened on the upper side of the double-T profiles, respectively. These holding profiles 80 each are defined by a U-profile, which has clearances 81, spaced apart from one another and tapering in a downwards direction, respectively, for receiving the front ends of the supporting profiles 38. Thus, the spacing of the clearances corresponds to the spacing of the supporting profiles 38.

When in use, the holding profiles 80 are covered up on top by a cover profile 82, also U-shaped, which, with its legs directed downwards because of corresponding dimension size, enters the holding profile 80, open at the top. In the holding profile 870, there is provided bolts 83 in a cross direction, spaced apart from one another. These bolts make a connection of the cover profile 82 with the holding profile 80 in the manner of a bajonet joint 84 possible (see FIG. 24).

The upper side of the cover profile 82 is provided with an elastic hollow body covering 85, which is to prevent injury to the animals from the cover profile 82.

As stated above, to clean the housing enclosure, first, the cover profile 82 is lifted after suitably loosening the bajonet joint 84 mentioned. Next, the net track includintg supporting profiles 38 is removed, e.g. rolled up. This rolling up is facilitated by the trapezoid-shaped clearances 81 in accordance with FIG. 23. Next—as described above—the transverse girders 24 cna be folded up around the supporting bolts 78. The enclosure floor is then clear for cleaning. Preferably, the net track 10 is cleaned outside of the housing enclosure. Subsequently, the supporting floor 21 is assembled again, that is, in reverse sequence. The described clearances 81 are located in the vertical legs of the U-shaped holding profile 80, respectively. The supporting profiles 38 are held within the clearances 81 by the upper cover profile 82

All of the features disclosed in the applilcation documents are claimed as essential to the invention inasfar as they are new, individually or in combination, compared to prior art.

What is claimed is:

1. Apparatus for housing small animals within a housing enclosure with a continuous, grate-shaped supporting floor made of synthetic material, and which is supported by supporting profiles (38) arranged transfer to a conveying direction of said floor in a spaced arrangement and each extending parallel to one another, wherein soft, elastic pads extend above and are supported in said supporting profiles that are upwardly open, on the upper side of the supporting floor, said profiles are in the form of the tube-like hollow bodies wherein the supporting floor is formed from a continuous track or a relatively finely meshed netting 10.

2. Apparatus according to claim 1, wherein the net (10) includes supporting profiles (38) slidably resting on a base or frame (75).

3. Apparatus according to claim 2, wherein the frame (75) is formed from individual frame segments, which are easily accessible for cleaning purposes when the net is rolled up.

4. In an apparatus for housing small animals, such as chickens, within a housing enclosure having a continuous grate-shaped conveyor supporing floor (21) made of longitudinal threads (70) and cross threads (71) of a finely meshed net (10) resting on supporting profiles (38) which are arranged transverse to a conveying direction of said net (10) and which are connected to lateral conveying means (51), said net (10) being connected to the supporting profiles (38) by elastic means, the improvement wherein said elastic means for connecting the net (10) with an upwardly open supporting profile (38) comprises a strip-like soft and elastic profile pad (40) which extends above the supporting profile (38) in a longitudinal direction thereof and which is anchored in the upwardly open supporting profile (38) by anchorning sections (25, 49) which also extend in the longitudinal direction of the profile pad (40), said anchoring sections (25,49) having clearances (69) for the passage of the longitudinal threads (70).

5. Apparatus according to claim 4, wherein the supporting profiles (38) are U-shaped profiles having an open upper end, and wherein said anchoring sections (25,49) of the profile pads (40) are anchored between legs (36,37) of the supporting profiles (38).

6. Apparatus according to claim 4, wherein the supporting profiles (38) are C-shapoed profiles with which the profile pads (40) are anchored in a positive manner by means of tip-stretched anchoring sections (49).

7. Apparatus according to claim 6, wherein said tip-stretched anchorning sections (49) have supporting lips (66) which rest against an inside of two legs of the supporting profile (38) with a clamping effect.

8. Apparatus according to claim 4, wherein said profile pads (40) are anchored in said supporting profiles (38) with their anchoring sections (25) by means of an embedding agent in the form of an adhesive.

9. Apparatus according to claim 5, wherein said legs (36,37) of each U-shaped supporting profile (38) extend to the plane of the net (10) and have slots (15) for the passage of longitudinal threads (70) of the net (10).

10. Apparatus according to claim 5, wherein said legs (36,37) of each U-shaped supporting profiles (38) have inwardly formed projections (53) for a positive anchoring of the anchorning sections (49).

* * * * *